United States Patent [19]
Albares et al.

[11] Patent Number: 4,696,536
[45] Date of Patent: Sep. 29, 1987

[54] INTEGRATED OPTICAL WAVELENGTH DEMULTIPLEXER

[75] Inventors: Donald J. Albares; Ronald E. Reedy, both of San Diego, Calif.

[73] Assignee: The United States of America as represented by the Secretary of the Navy, Washington, D.C.

[21] Appl. No.: 750,630

[22] Filed: Jul. 1, 1985

[51] Int. Cl.⁴ .............................................. G02B 6/34
[52] U.S. Cl. .................................. 350/96.19; 350/96.15
[58] Field of Search ............... 350/96.11, 96.12, 96.13, 350/96.14, 96.15, 96.19; 370/1, 3; 455/610, 612

[56] References Cited

U.S. PATENT DOCUMENTS 4,372,642  2/1983  Singer et al. ................... 350/96.12

FOREIGN PATENT DOCUMENTS

83/03506  10/1983  PCT Int'l Appl. ................ 455/612

OTHER PUBLICATIONS

*Applied Optics*, Jun. 1982, vol. 21, No. 12, "Integrated Optic Wavelength Multi-and Demultiplexers using Chirped Grating", pp. 2195-2198.
*Optics Letters*, Oct. 1983, vol. 8, No. 10, Optical Society of America, "Total-Reflection Wavelength Demultiplexer" pp. 531-533
"Development of the Multiwavelength Monolithic Integrated Fiber Optics Terminal" SPIE, vol. 317, Integrated Optics & Milimeter & Microwave Integrated Circuits, 1981-C. R. Chubb et al.
"Waveguide Grating Lenses for Optical Couplers", Gen-Ichi Hatakoshi et al, Applied Optics, vol. 23, No. 11, Jun. 1, 1984.
"Periodic Structures for Integrated Optics", Amnon Yariv et al, IEEE Journal of Quantum Electronics, vol. QE 13, No. 4-Apr. 1977.
Integrated Optics; Theory and Technology-R. G. Hunsperger, Spring Valley 2nd Ed., Berlin 1984.
"Guided-Wave Holographic Grating Beam Expander-Fabrication and Performance" V. Neuman et al-Electronic Letters, vol. 17, No. 4, pp. 165-167, Feb. 19, 1981.
"Chirped Gratings in Integrated Optics"-A Kitszer et al, IEEE Journal of Quantum Electronics, vol. QE 13, No. 4, Apr. 1977.
"Chirped Grating Demultiplexers in Dielectric Waveguides", A. C. Livanos et al, Applied Physics Letter, vol. 30, No. 10, May 15, 1977.
"High Performance Focusing Grating Coupler Fabricated by Electron-Beam Writing" T. Suhara et al, Integrated and Guided Wave Optics Topical Meeting, Apr. 1984.
"Silicon Photodetector Integrated on a Lithium Tantalate Substrate", Applied Physics Letters, 44 (1), Jan. 1, 1984, Ronald E. Reedy et al.

*Primary Examiner*—Eugene R. LaRoche
*Assistant Examiner*—James C. Lee
*Attorney, Agent, or Firm*—Robert F. Beers; Ervin F. Johnston; Thomas Glenn Keough

[57] ABSTRACT

An optical wavelength demultiplexer is fabricated as an integral part of an integrated circuit chip. A waveguide in a common substrate having a chirped diffraction grating receives a number of wavelengths of optically modulated data from a single mode fiber. The wavelengths are diffracted from the plane of the lines of the grating into discrete beams angles through the substrate and impinge on appropriately located photodetectors. Signals provided by the detectors are fed to and processed by other integrated circuitry also contained on the chip. The common transparent substrate such as fused silica, glass, sapphire, lithium niobate or lithium tantalate mount semiconductor films of Si, Ge, GaAs or quanternary alloys that have the detectors and other integrated circuitry that are created by conventional CVD techniques. The waveguide and appropriate chirp grating are formed by established deposition and photolithographic procedures ot assure the separation of as many as fifty discrete beams of as many different wavelengths and their projection onto a like number of photodetectors to provide for a heretofore unattainable degree of optical wavelength demultiplexing.

15 Claims, 13 Drawing Figures

SCATTERING BY A CHIRPED GRATING

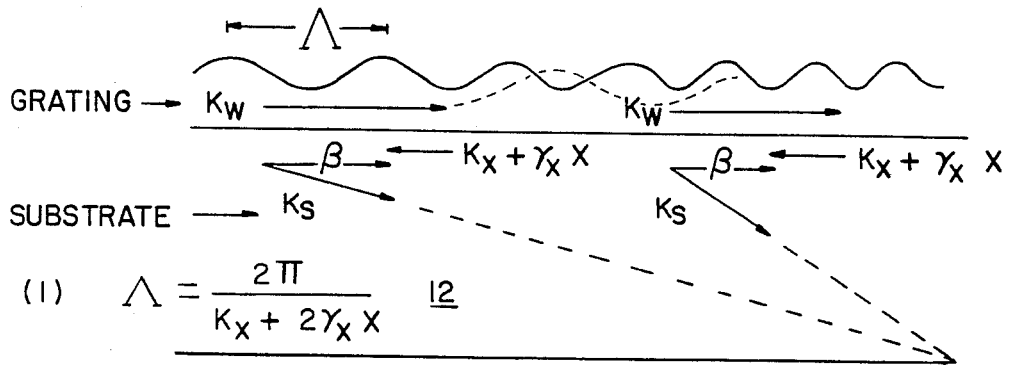

(1) $\Lambda = \dfrac{2\pi}{K_X + 2\gamma_X X}$  12

PERMITTIVITY FLUCTUATION (2) $\Delta\epsilon = \cos(K_X X + \gamma_X X^2 + \gamma_Y Y^2)$

APERTURE FIELD (3) $E_Y = \exp\left[i\beta X - X^2\left(i\gamma_X + \dfrac{1}{\sigma_X^2}\right) - Y^2\left(i\gamma_Y + \dfrac{1}{\sigma_Y^2}\right)\right]$

RADIATION FIELD (4) $E_Y = \exp\left[i\left(\beta X + \sqrt{K_s^2 - \beta^2}\, Z\right) - \dfrac{(X-X_0)^2}{S_X^2} - \dfrac{Y^2}{S_Y^2}\right]$

*FIG. 2*

BEAM PROPERTIES (1) BEAM CENTER $$X_0 = \frac{\beta}{\sqrt{K_S^2 - \beta^2}} Z_0$$

(2) BEAM WIDTH $$B_x = \frac{2}{\gamma_x \sigma_x} \left[ 1 + (\gamma_x \sigma_x^2)(\frac{2Z \gamma_x K_S^2}{(K_S^2 - \beta^2)^{3/2}} - 1)^2 \right]^{1/2}$$

$$\simeq \frac{2}{\gamma_x \sigma_x} \left[ 1 + b^2 (\lambda - \lambda_0)^2 \right]^{1/2}$$

BEAM PROPERTIES AT THE OPTIMUM ANGLE

BEAMWIDTH $$B_x = \frac{2}{\gamma_x \sigma_x} \left[ 1 + O(\lambda - \lambda_0)^4 \right]^{1/2}$$

AVERAGE GRATING WAVENUMBER $$K_x = K_s \left[ \frac{n_w}{4 n_s} + \sqrt{\left(\frac{3 n_w}{4 n_s}\right)^2 - \frac{1}{2}} \right]$$

OPTIMUM ANGLE $$\theta \simeq 30° - \left(\frac{180\sqrt{3}}{\pi}\right)\left(\frac{n_w}{n_s} - 1\right)°$$

BEAM PATTERNS VS WAVELENGTH
λ = 0.08μ(1±0.002 N)

INTEGRATED OPTICAL WAVELENGTH DEMULTIPLEXER

STATEMENT OF GOVERNMENT INTEREST

The invention described herein may be manufactured and used by or for the Government of the United States of America for governmental purposes without the payment of any royalties thereon or therefor.

CROSS-REFERENCE TO RELATED APPLICATION

This is related to a copending U.S. patent application Ser. No. 538,461 to Ronald E. Reedy entitled "Fabrication of Semiconductor Device in Recrystallized Semiconductor Films on Electrooptic Substrates".

BACKGROUND OF THE INVENTION

The vastly increased data rates that can be handled in the optical spectrum is channelling creativity to address heretofore unsolved problems. Commercially available single mode fibers of an acceptable attenuation and dispersion are making full scale data systems a reality. While a single mode fiber transmitting at a single wavelength can handle a considerable amount of data, wavelength multiplexing of data through this fiber provides an even more vast data transmission capability. Unfortunately, the state-of-the-art has failed to produce a wavelength demultiplexing scheme which is consistent in the level of preciseness and reliability needed for acceptable operation.

The known methods for accomplishing wavelength demultiplexing generally employ discrete dispersive and focusing elements in the form of aligned gratings or prisms or have multilayer interference filters in combination with focusing elements. These are limited in the accuracy of their fabrication and assembly, their stability, the reliability of the packaging, by the mechanical holders or cements that hold them together, the number of channels which are capable of being demultiplexed and, of course, the overall cost of such an arrangement.

There has been no incorporation of the optical demultiplexing function into the technology that advantageously can accommodate high data rates, that being the VLSI or VHSIC technologies. Interface problems associated with coupling separated demultiplexers to integrated circuit chips introduce a great number of comprimises that limit the full utilization of the chip's capabilities which could otherwise meet the high data rate transmission capabilities of optical transmission systems. An example of such an optical multiplexing-demultiplexing system, which in itself is a noteworthy advance in the state-of-the-art, is referred to in the paper by C. R. Chubb et al entitled "Development of the Multiwavelength Monolithic Integrated Fiber Optics Terminal, *SPIE*, Vol. 317 *Integrated Optics and Milimeter and Microwave Integrated Circuits* (1981).

Thus, there is a continuing need in the state-of-the-art for wavelength division demultiplexer capable of being fabricated in accordance with established integrated circuit fabrication techniques to provide up to fifty discrete wavelength demultiplexed channels.

SUMMARY OF THE INVENTION

The present invention is directed to providing an apparatus for wavelength demultiplexing optical data on an integrated chip substrate. A waveguide receiving a number of discrete optical modulated wavelengths is disposed on a substrate and is provided with a chirp grating pattern. The wavelengths are diffracted from the plane of the grating through the substrate in an equal number of discrete beams at discrete diffraction angles to impinge on appropriately located photodetectors. The photodetectors disposed in a semiconductor film on the substrate along with other electrical integrated circuit components are actuated in accordance with the information content of each of the modulated wavelengths such that representative electrical signals are passed to the associated integrated circuitry also contained in the chip. As many as fifty discrete beams can be separated and directed to discrete photodetectors in accordance with the design of the chirp grating pattern. Transparent substrates such as sapphire, lithium tantalate or lithium niobate may be selected and Si, Ge, GaAs or quaternary semiconductor films are chosen for the detectors and associated integrated electronic circuits on the chip.

A prime object of the invention is to provide for an optical wavelength demultiplexer on an integrated chip.

Another object is to provide for an optical wavelength demultiplexing of discrete wavelengths through an integral chirp diffraction grating on an integrated chip.

Another object is to provide an optical demultiplexing of discrete wavelengths by focussing discrete beam patterns out of the plane of a chirp diffraction grating onto individual ones of photodetectors.

Yet another object is to provide for an optical demultiplexing of discrete wavelengths through a chirp diffraction grating diffracting discrete wavelengths to appropriately located photodetectors.

Yet another object is to provide for an optical wavelength demultiplexer integrated chip having a plurality of integrated juxtaposed photodetectors arranged to sense optically encoded information.

Yet a further object is to provide for an optical wavelength demultiplexer in an integrated circuit chip having a chirp diffraction grating diffracting discrete beams at discrete diffraction angles to a like number of integrated photodetectors.

Still another object of the invention is to provide for an optical wavelength demultiplexer having up to a 50-wavelength optical demultiplexing capability.

Yet a further object is to provide for an optical wavelength demultiplexer integrated on a chip having a sapphire, lithium tantalate or lithium niobate or other transparent substrate and a Si, Ge, GaAs or quaternary alloy thin film that is compatible with associated electronic integrated circuits including photodetectors on an integrated chip.

Still a further object is to provide for an optical wavelength demultiplexer having a substrate and semiconductor film separated by a silicon dioxide thermal buffer layer for reducing for processing problems associated with integrating semiconductors with certain substrates such as lithium niobate and lithium tantalate.

These and other objects of the invention will become more readily apparent from the ensuing description when taken in conjunction with the drawings and the accompanying claims.

BRIEF DESCRIPTION OF THE DRAWING

FIG. 2 shows a part of the optical demultiplexer and equations (1),(2),(3) and (4) relating the variable longitudinal grating wavelength and the guided wave wavenumber to radiation properties of a chirped grating.

DESCRIPTION OF THE PREFERRED EMBODIMENT

Figure 1:
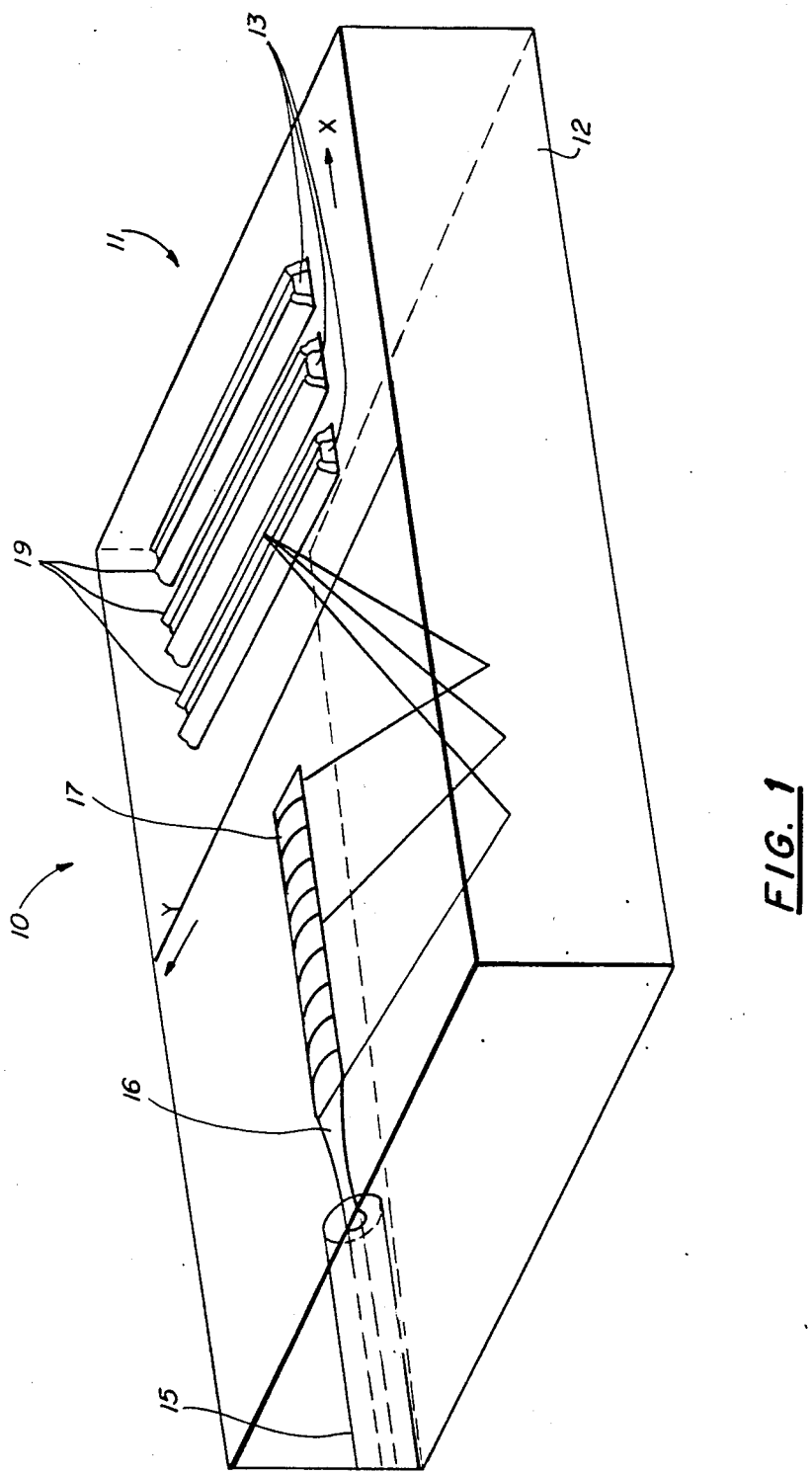
FIG. 1 is an isometric depiction of a portion of the principal constitutents assuring optical wavelength demultiplexing of one wavelength of several and utilizing reflection from the bottom of the substrate.

Referring now to FIG. 1 of the drawings, an optical wavelength demultiplexer 10 is included as an integral constituent of an integrated chip 11. The optical wavelength demultiplexer and the chip share a common substrate 12 which coextends and provides an operational base for the optical and electronic components. The substrate is fashioned out of proven optically transparent materials, for example an electrooptic substrate like lithium niobate, lithium tantalate or sapphire is acceptable for this application since they transmit energy at wavelengths of interest. A portion of the integrated chip has a semiconductor film 13 deposited and laser annealed on top of the substrate. The film is suitable for integrated electronic components such as MOSFET photodetectors. Silicon is a likely candidate, however germanium, gallium arsenide, or quaternary alloys may be used to accommodate the technological goals if desired. Optionally, a thermal buffer layer is between the film and the substrate to isolate the film from optical energy propagating along a surface of the substrate. The thermal buffer layer can be visualized in the drawings as being in the line separating substrate 12 and film 13 in FIGS. 10 and 11.

The optical wavelength demultiplexer is ideally suited for demultiplexing modulated optical wavelengths emanating froma single mode fiber 15. Single mode fibers have been greatly improved and efficient transmission of single mode information at a number of wavelengths is a present day reality due to advances in the state-of-the-art.

The multiwavelengths of energy are fed to a waveguide 16 formed in the surface of the substrate. The waveguide and single mode fiber are appropriately coupled to reduce losses and avoid phase shifts or other distortion causing influences to the transmitted information and the guide itself is fabricated in accordance with any one of a number of conventional techniques.

Spatial separation of the different wavelengths of the incoming optical signal through the single mode fiber is performed by chirped grating 17. The waveguide and chirped grating are formed in or on the substrate by depositing or diffusing a material of higher refractive index on or into the upper surface of a portion of the substrate. The resultant change of refractive index in the deposited or diffused layer forms a waveguide about one wavelength thick to guide the optical wavelengths from the single mode fiber. For example, the waveguide can be a PMMA, silicon nitride or polyimide having refractive indexes of 1.6, 2.1 or 1.6, respectively, so as to assure the proper waveguide action of the transmitted light, it being assumed that the substrate is a material of index lower than the waveguide material. Typical articles establishing the well known techniques for providing waveguides on substrates are "Waveguide Grating Lenses for Optical Couplers" Gen-Ichi Hatakoshi et al, *Applied Optics,* Vol. 23, No. 11, Jun. 1, 1984 in which electron beam resist PMMA was coated to form a 2-micron thick waveguide layer on a quartz glass plate substrate for fabricating a diffraction grating thereon, and "Periodic Structures for Integrated Optics" by Amnon Yariv et al, *IEEE Journal of Quantum Electronics,* Vol. QE 13, No. 4 dated April 1977 dealing with the fabrication of thin film waveguides. A recent book on this subject is *Integrated Optics; Theory and Technology* by R. G. Hunsperger, Spring Valley 2nd Ed., Berlin 1984.

The waveguide is embossed or etched with a chirped differential grating 17 extending about 400 microns. One technique for forming the chirped grating is that a photoresist mask laid out with known lithographic techniques and ion etching converts the exposed surface of the waveguide into a chirped diffraction grating configuration. The configuration of the chirped diffraction grating is such as to diffract various wavelengths transmitted from the single mode fiber through the waveguide into different angles of diffracted beams of light. The angularly diffracted beams are at discrete angles away from the plane in which the diffraction grating is located and each angle is a function of the wavelength being diffracted. Examples of state-of-the-art techniques for making a chirped grating are shown in the above articles as well as the article entitled "Guided-Wave Holographic Grating Beam Expander-Fabrication and Performance" by V. Neuman et al appearing in *Electronic Letters,* Vol. 17, No. 4, pp 165-167, Feb. 19, 1981. Also see "Chirped Gratings in Integrated Optics" A. Kitszer et al *IEEE Journal of Quantum Electronics,* Vol. QE 13, No. 4, April 1977. Also see "Chirped Grating Demultiplexers in Dielectric Waveguides" A. C. Livanos et al, *Applied Physics Letter,* Vol. 30, No. 10, May 15, 1977 and "High Performance Focusing Grating Coupler Fabricated by Electron-Beam Writing" by T. Suhara et al, *Integrated and Guided Wave Optics Topical Meeting,* April 1984. The grating period and chirp rate are selected so that the emerging beams focus on either the substrate face that is opposite the grating or on the same face as the grating, in the latter case a proper reflective layer 18 must be provided, see FIG. 10. The period and chirp rate of the grating serves to focus the beams of different frequencies and spatially disperse them in accordance with their different wavelengths. Properly configuring the chirp grating to achieve a desired beam dispersion can be made in accordance with techniques and theory established in the art. The embossing or etching of the chirp grating pattern on the surface of the waveguide material in the substrate is performed by ion milling through a photoresist grating. A photoresist grating on the waveguide is established by holographically exposing a photoresist film and a subsequent development of the photoresist. With such a technique a designer has the flexibility to change the grooves' separation along the length of the grating and thereby influence different wavelengths of the incoming optical multiplexed signal to be diffracted at different discrete angles from along the grating.

Integration of the optical demultiplexing function with the electronic signal processing on an integrated chip is an important capability of this inventive concept. A substrate having optically transparent properties is needed for the integrated optical circuit. However, a semiconductor film is needed for fabrication of the electronic circuit components. The components for the electronic signal processing function is shared with part of the components of the optical wavelength demultiplexing function and are located on a semiconductor film 13.

Integration of the optical and electronic functions on a single substrate, and hence on an integrated chip by reason of integrating a suitable semiconductor film has been demonstrated as a realized capability and is thoroughly discussed in a paper by Ronald E. Reedy et al entitled "Silicon Photodetector Integrated on a Lithium Tantalate Substrate", *Applied Physics Letters* 44 (1), Jan. 1, 1984 as well as the related application identified above. Laser annealing and lattice matching of silicon films on substrates makes feasible the integration of optical and electronic functions on a single chip.

Figure 12:
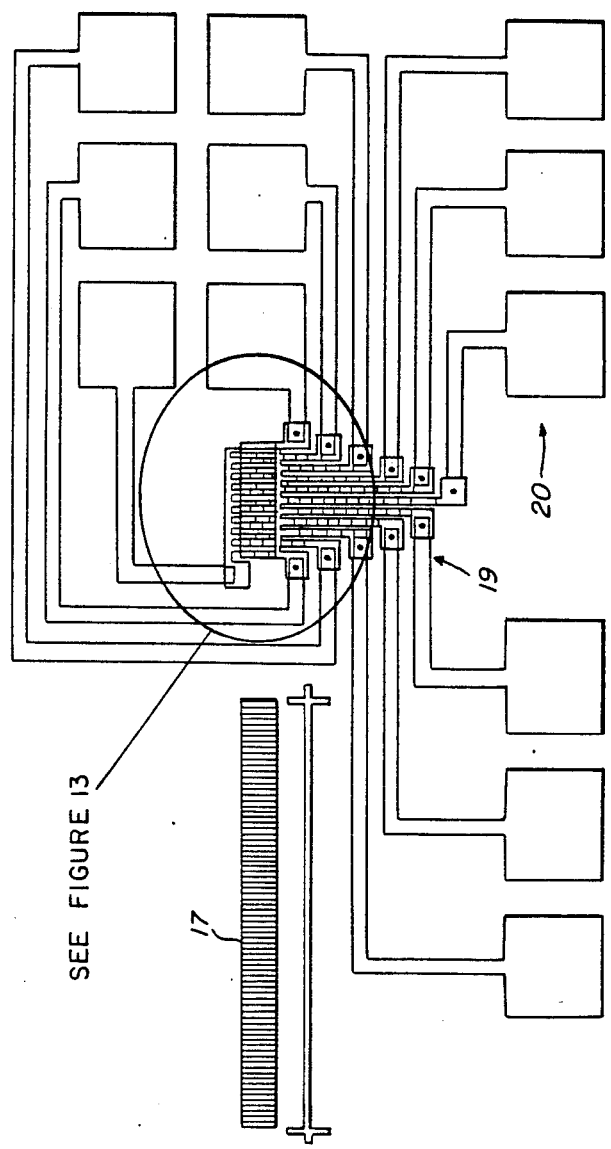
FIG. 12 shows a top view of a chirped diffraction grating and the optical sensors associated therewith on a composite opto-electronic integrated chip.
Figure 13:
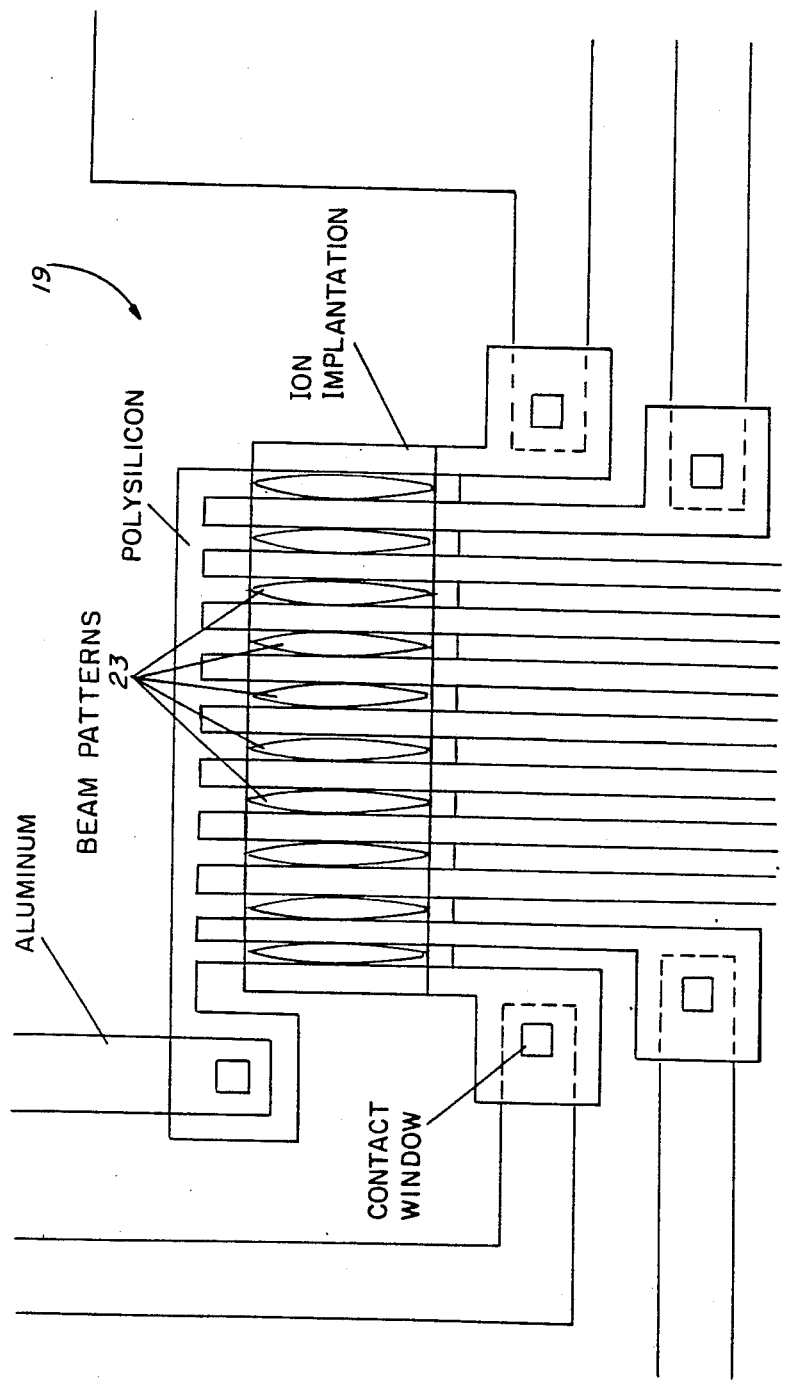
FIG. 13 shows details of FIG. 12.

Optical waveguide 16 introduces the discrete optical wavelengths onto the chip and is an integral part located on the substrate in a layered or multilayered form. It is expanded into chirped grating 17. Photodetectors 19 and their associated electronic circuitry 20, see FIG. 12 and 13, are fabricated and, therefore, integrated within the semiconductor film.

Figure 10:
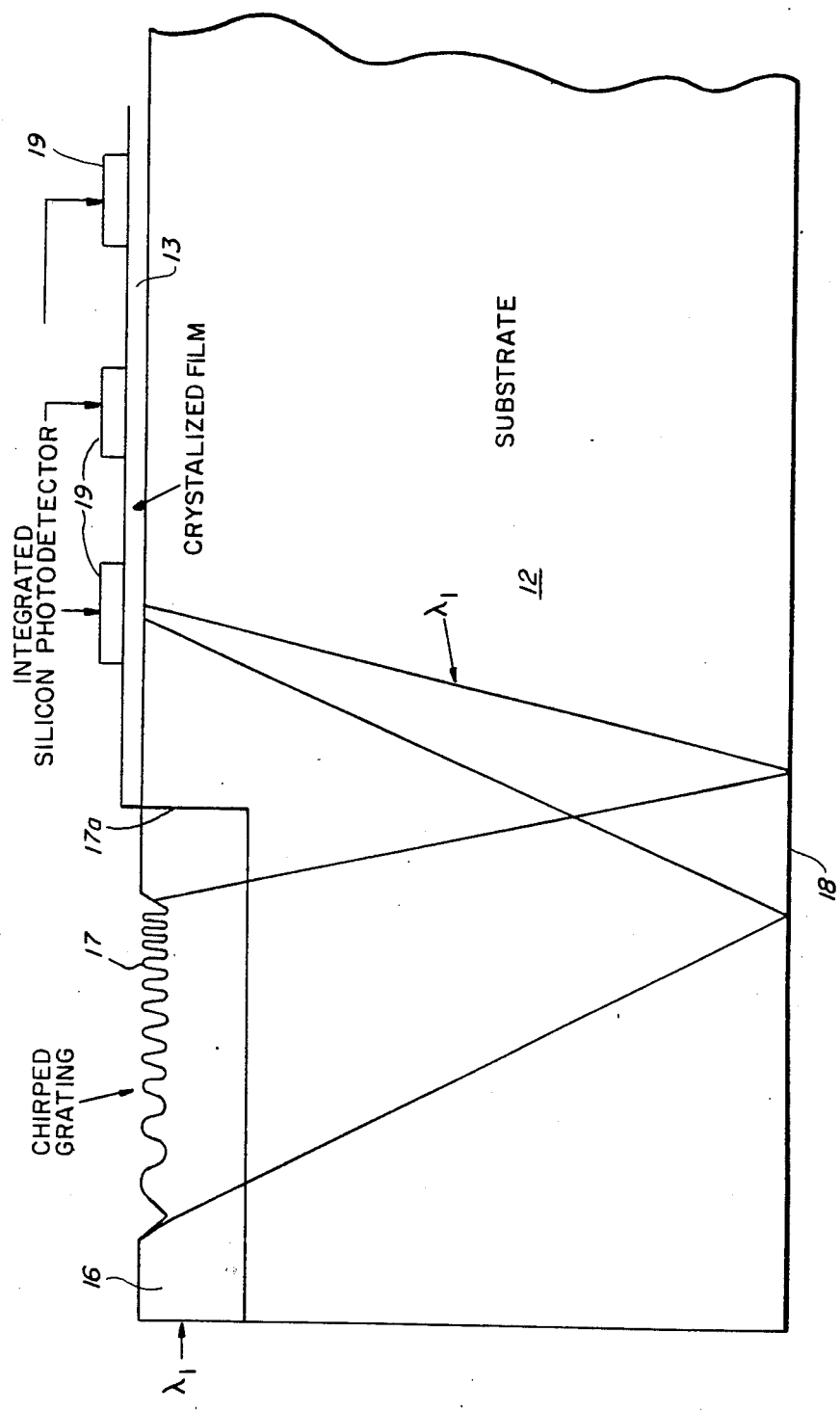
FIG. 10 is a cross-sectional depiction of the embodiment of FIG. 1.
Figure 11:
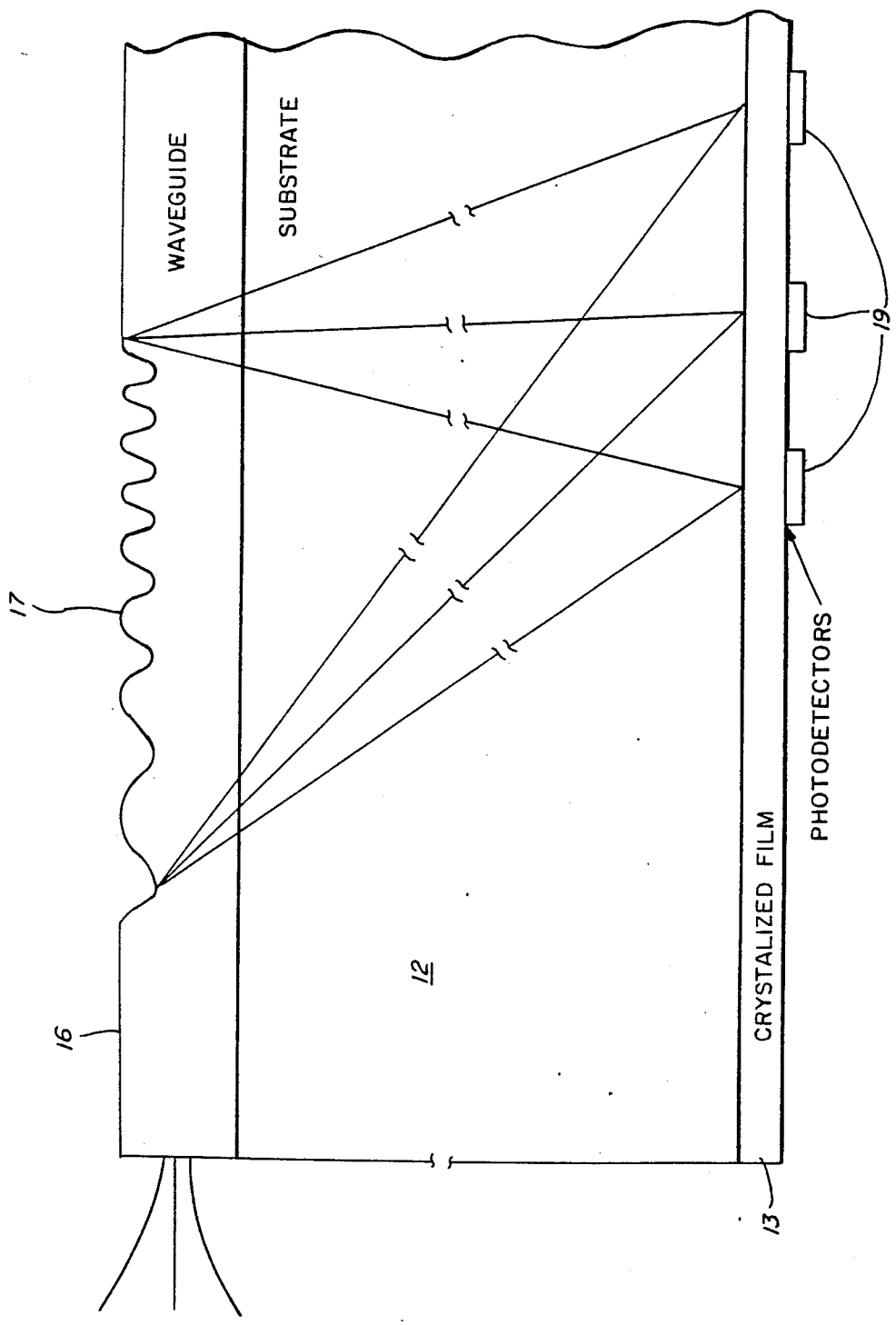
FIG. 11 shows a variation on the design of the optical wavelength demultiplexer having the photodetectors at the base of the substrate.

Referring to FIG. 10 the optical portion of the demultiplexing circuit has waveguide 16 with an embossed or etched chirped grating 17. A plurality of modulated inputted waveforms $\lambda_i$ are depicted as entering the waveguide from the left. The waveguide is coupled with an acceptable match to the single mode fiber to minimize scattering and has a wide aperture or a block 17a on its other end in order to confine the radiation that emerges from the grating region. Typically the waveguide has a width of from between 3 and 10 microns where it is coupled to the fiber and a width of a few tens of microns where the grating is shaped on the waveguide. The chirp grating is fashioned according to established techniques in the art as fully explained in the cited publications above and varies in a periodic function. Although detectors 19 are provided in semiconductor film 13 on top of the substrate, the detectors may be mounted in a semiconductor film 13 on the bottom of the substrate as shown in FIG. 11. In the former case a reflective surface or coating 18 must be provided.

As schematically depicted in FIG. 2, the grating is chirped which, stated in another way, means that the period of the etched surface increases along the waveguide. Light scattered by the grating emerges at an angle determined by the average period of the grating. The longer the period, the lower the scattering angle as measured from the direction in which the radiation enters the waveguide. This effect can be expressed as being a consequence of momentum conservation. Light in the waveguide has a longitudinal wave number (or momentum) which is indicated as $K_w$ in FIG. 2. The grating has a varying wave number (momentum) $K_x + \gamma_x x$ which increases in the direction of decreasing grating wavelength, i.e. to the right. The difference in wave number (momentum) determines the angle (horizontal momentum) at which radiation from the grating occurs. By selecting the chirp rate parameter $\gamma_x$ appropriately, energy scattered by different portions of the grating is directed to the same point which becomes a focal point of the optical system.

The equations representative of the analysis of wavelength responsive scattering of the chirped grating are set forth as equations (1),(2),(3) and (4) in FIG. 2 noting that (1) is the period and (2) sets forth the characterization of the etched grating region as a variation in permittivity that to the first order of diffraction is a trignometric function of quadratic argument. When the grating amplitude tapers towards the ends, the scattered field just below the grating has the appearance of a Gausian of characteristic widths of $\sigma_x$ and $\sigma_y$ in the x and y directions, respectively. The radiation pattern associated with this aperture field, noting (3) is a Gausian as well but with more complex characteristics widths.

Figure 3:
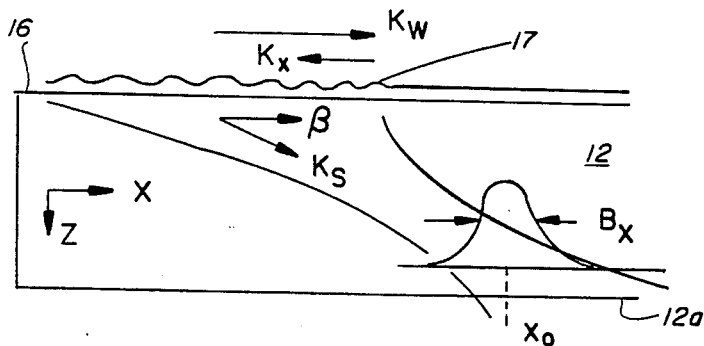
FIG. 3 depicts a portion of the optical wavelength demultiplexer with equations (1) and (2) formed by a chirped grating at a wavelength λ near central wavelength $\lambda_o$.

Examination of the analytical expression for the radiation field, see (4) shows that the beam center at a central design wavelength follows the angle expected from momentum conservation considerations and that the wavelength dependence of the guided wave number $K_w$ and the substrate wave number $K_s$ lead to similarly predictable variations of the beam center with wavelength. The widths of the beams produced by the grating also vary with wavelength. Analysis shows the beamwdith to have the behavior represented in FIG. 3. When the grating is designed to focus at a wavelength $\lambda_o$, any deviation from this wavelength causes an increase in the beamwidth at the focal plane here shown to be on the opposite surface 12a of the substrate at a location of the beam center $x_o$, see FIG. 3(1) and having a beamwidth of $B_x$, see FIG. 3(2). The lowest order term in the wavelength correction to the beamwidth has the quadratic dependence on deviation from $\lambda_o$.

Figure 4:
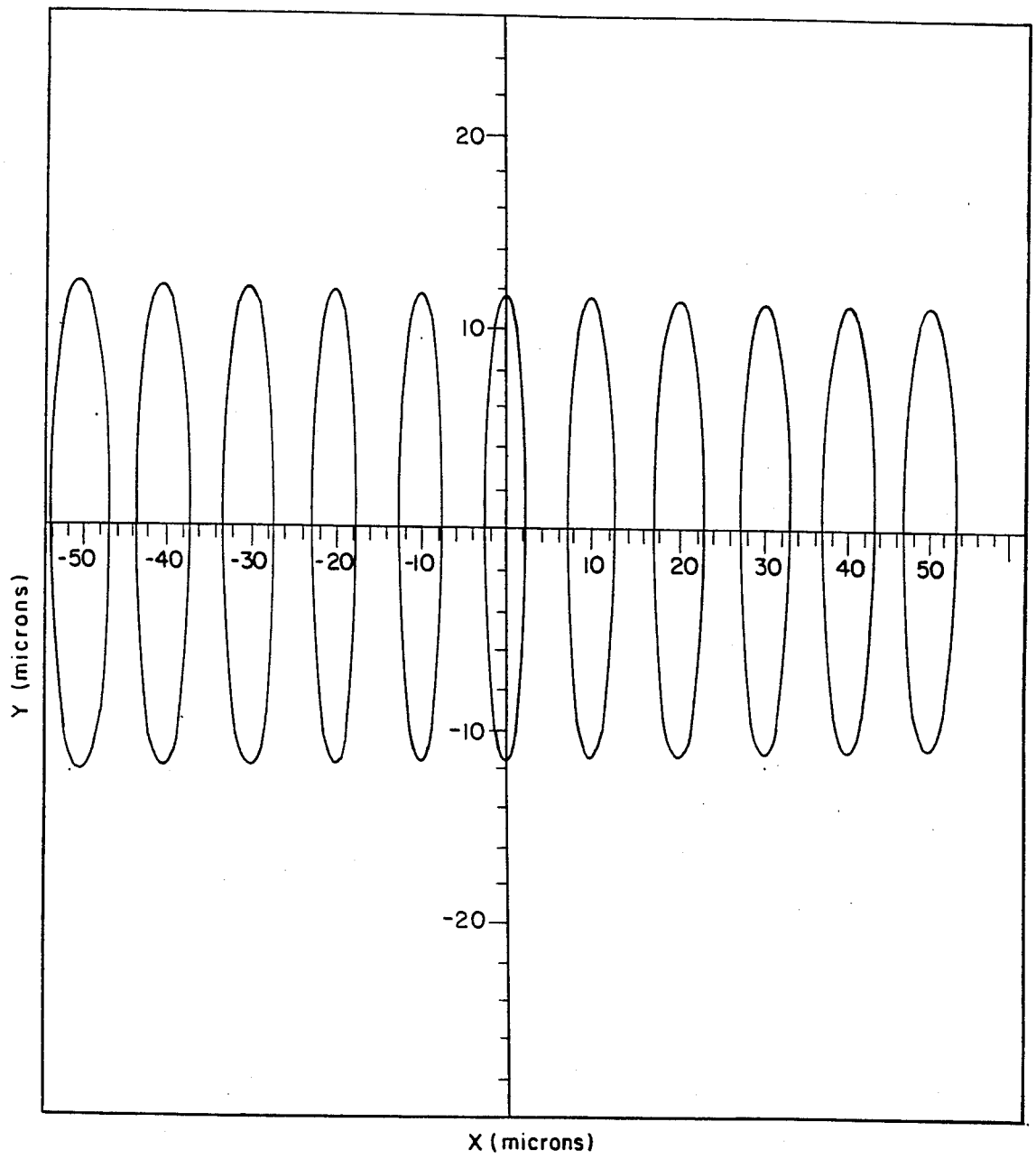
FIG. 4 shows wavelength separated beam patterns formed at a perpendicular distance of one mm from a chirped grating. The grating length, width, and average period are 92, 20 and 0.36 microns, respectively. The wavelength of the central beam is 0.8 microns and the wavelength separation between adjacent beams is 0.008 microns or 1%.
Figure 5:
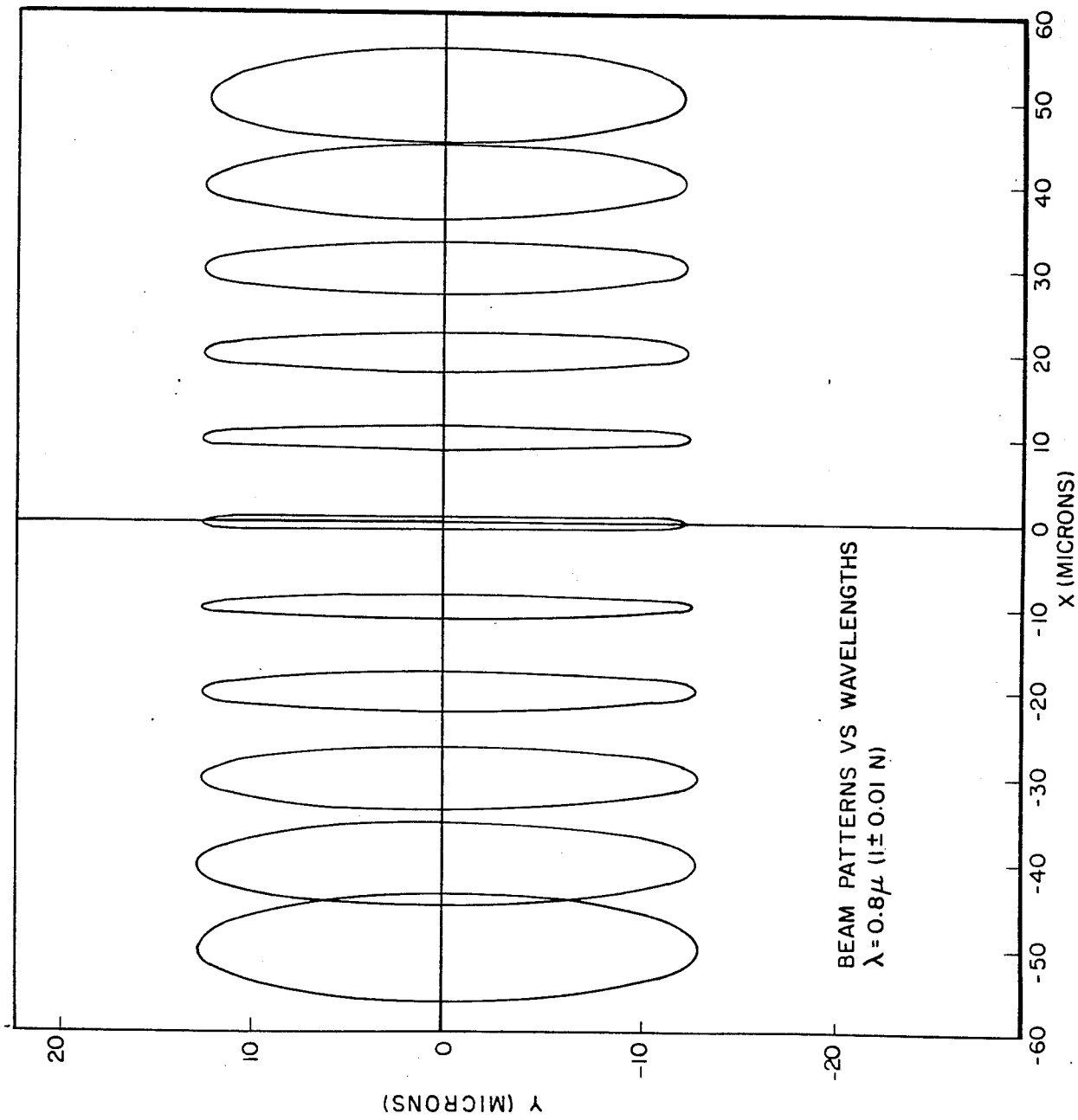
FIG. 5 is a depiction of wavelength separated beam patterns formed at a perpendicular distance of one mm from a chirped grating. The grating length, width, and averge period are 232, 20 and 0.36 microns, respectively. The wavelength of the central beam is 0.8 microns and the wavelength separation between adjacent beams is 0.008 microns 1%.

Representative examples of beam properties as a function of wavelength are set out in FIGS. 4 and 5. The grating dispersion parameters were selected so that focusing occurred at a perpendicular distance of 1 millimeter from the grating. Such a spacing would correspond to a ½ millimeter thick substrate when a bounce of the beam from the base of that substrate is included in the design (this design choice embraces the embodiment set forth in FIG. 10).

Equal-amplitude curves represent the beams and correspond to the points at which the beam amplitude drops to $1/e$ of its peak value, that is, the power drops to $1/e^2$. Only a small fraction of the total power in the beam falls outside of the $1/e$ equal amplitude curve of the beam. A total wavelength variation of ±5% in increments of 1% variation in wavelength are depicted in FIGS. 4 and 5.

Figure 6:
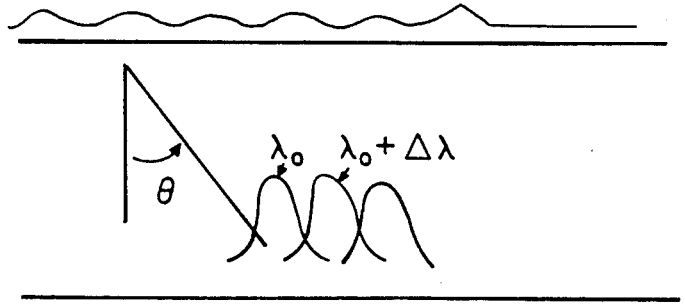
FIG. 6 sets forth equations that describe the beamwidth, the grating wavenumber, and the angle at which the second order variation of beamwidth with wavelength is zero. These parameters are described in terms of grating half-length $\gamma_x$, grating wavenumber variation $\sigma_x$, and length, and wavenumber variation and guided wave and substrate refractive indices $n_w$ and $n_s$, respectively.

Of particular interest in examining these figures is the beam separation. The overlap of beams such as portrayed in FIG. 5 evidences deleterious cross-talk between optical channels represented by the different wavelengths. Cross-talk may also result from the presence of two different polarization components in the guided wave at any given wavelength. The dispersion in beam size as represented by the parameter $B_x$ in FIG. 3(2) is found to be a function of the angular direction of the beam at the central wavelength $\lambda_0$. Most important from the design point of view, the dispersion reduces to 0 at a certain angle that depends on the physical parameters of the device. As noted in FIG. 6, the dispersion of the beams at this unique angle exhibits a 4th order dependence on deviation in wavelength from the central wavelength $\lambda_0$ rather than the second order behavior set out in FIG. 3. The angle at which the dispersion is minimized and the grating number at the center of the grating that is needed to direct the beams to this angle are also expressed in FIG. 6. For the conditions found in waveguides the minimum dispersion angle is close to 30° as measured from broadside.

Figure 7:
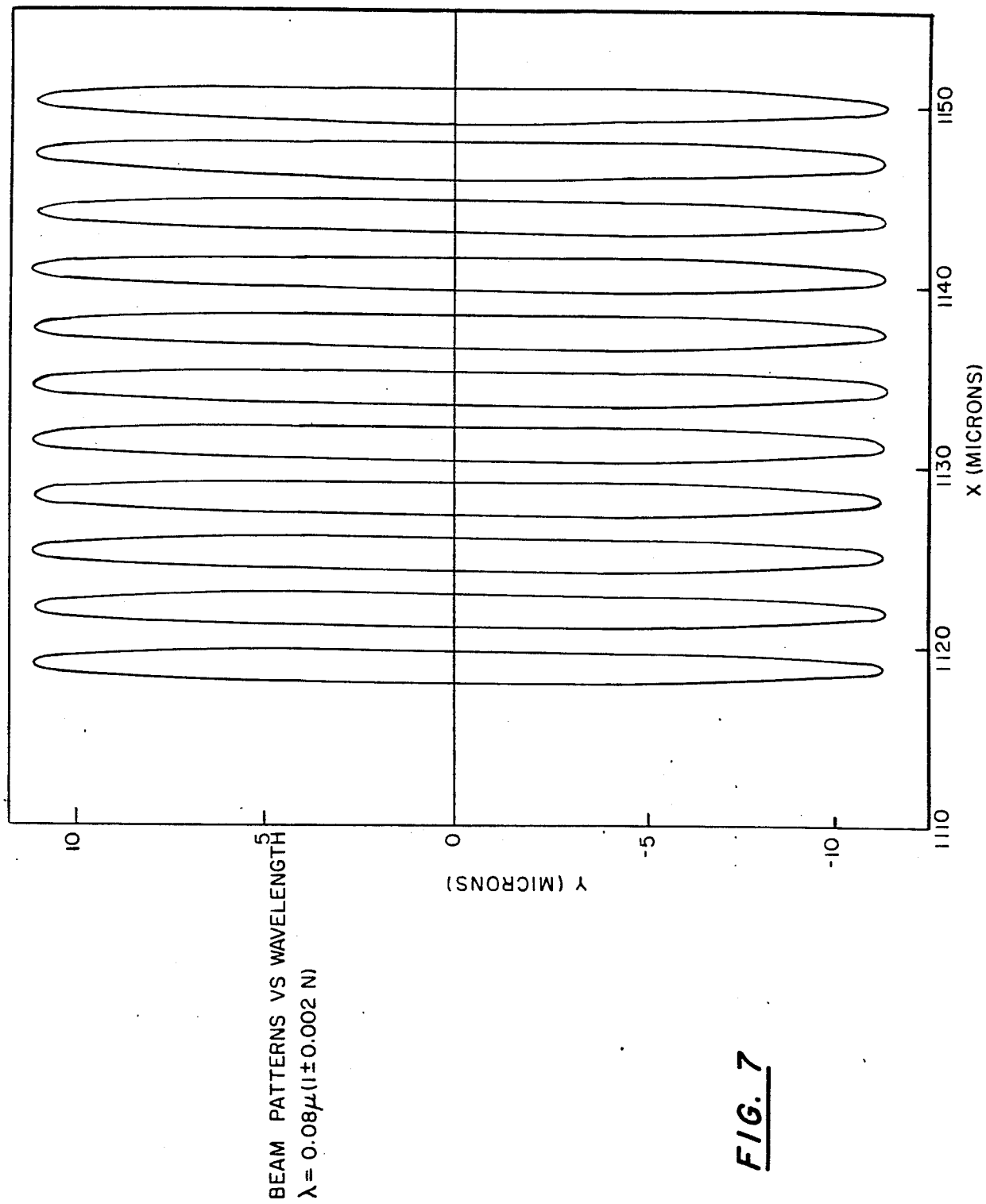
FIG. 7 is wavelength separated beam patterns formed at a perpendicular distance of 1 mm from a chirped grating designed to produce a focused central beam at the optimum angle for beamwidth variation with wavelength. The length and width of the grating are 700 and 20 microns, respectively. The wavelength of the central beam is 0.8 microns and the wavelength separation between adjacent beams is 0.0016 or 0.2%.

Beam patterns for a grating that generates beams at an angle for minimum wavelength dispersion are set forth in FIG. 7. The beams are shown over a ±1% total wavelength variation of $\delta\lambda/\lambda$ at 0.2% wavelength intervals. The width and spacing of the beams is in the range of 2 microns. This size is compatible with modern lithographic techniques that can be applied to the fabrication of the detector structures. The active portion of such a detector structure for each channel would be about 2 micros×25 microns in size.

Figure 8:
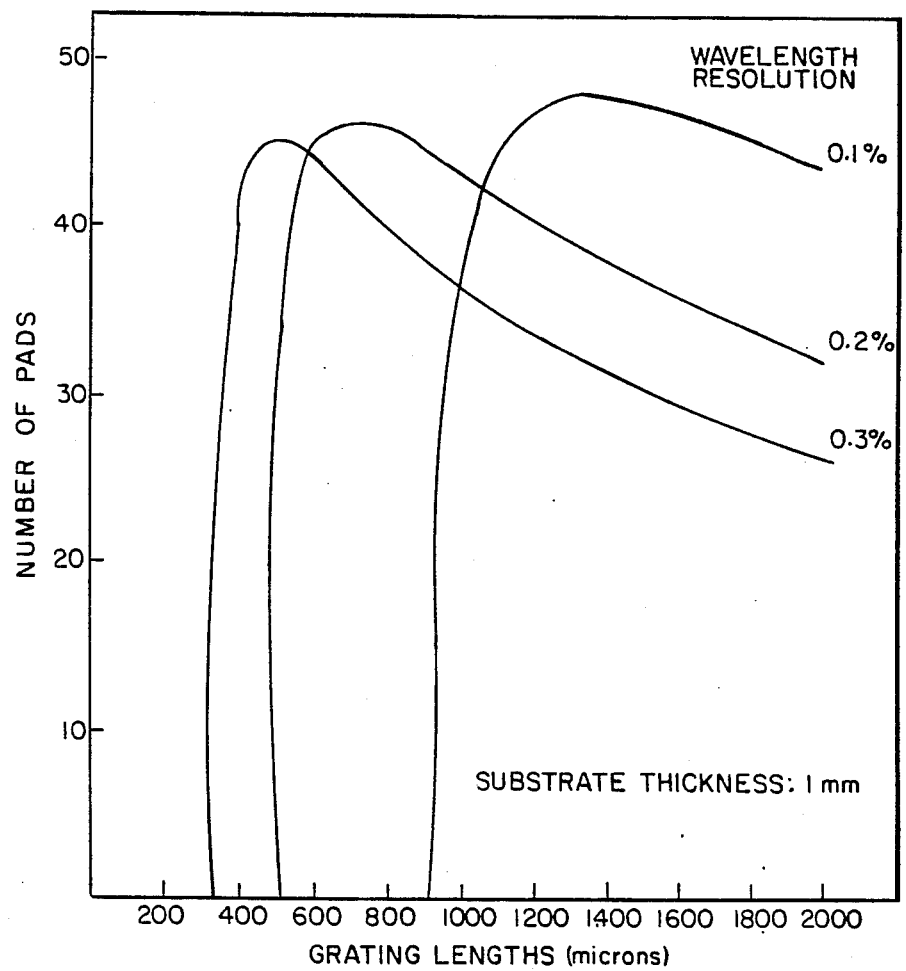
FIG. 8 shows the relationship between grating length and the number of nonoverlapping pads or beams that can be formed at a perpendicular distance of one mm from a chirped grating. The beams do not overlap to the 1/e point in amplitude. Wavelength separation between adjacent beams is shown as a parameter.

The uniformity of the beams shown in FIG. 7 is an attractive feature of the disclosed arrangement. Looking to FIG. 8 and FIG. 9 computations have shown that the number of overlapping beams that can be generated by the device as a function of the length of the grating and the wavelength separation between the beams is considerable, as many as 50. The separation of the wavelengths indicate a maximum number of individual data channels that the device can support. The actual number of channels, of course, depends on the detector configuration which is integrated in the semiconductor film which lies in the same or very nearly the same plane as the waveguide and chirp grating (as in the embodiment of FIG. 10).

The length of the grating is a factor in determining the number of channels because the beam size at the detectors depends on the grating length. A larger aperture size is needed to resolve wavelength of 0.1% as compared to a grating needed to resolve 0.2% difference. Forty to fifty channels therefor is a realistic maximum figure.

Figure 9:
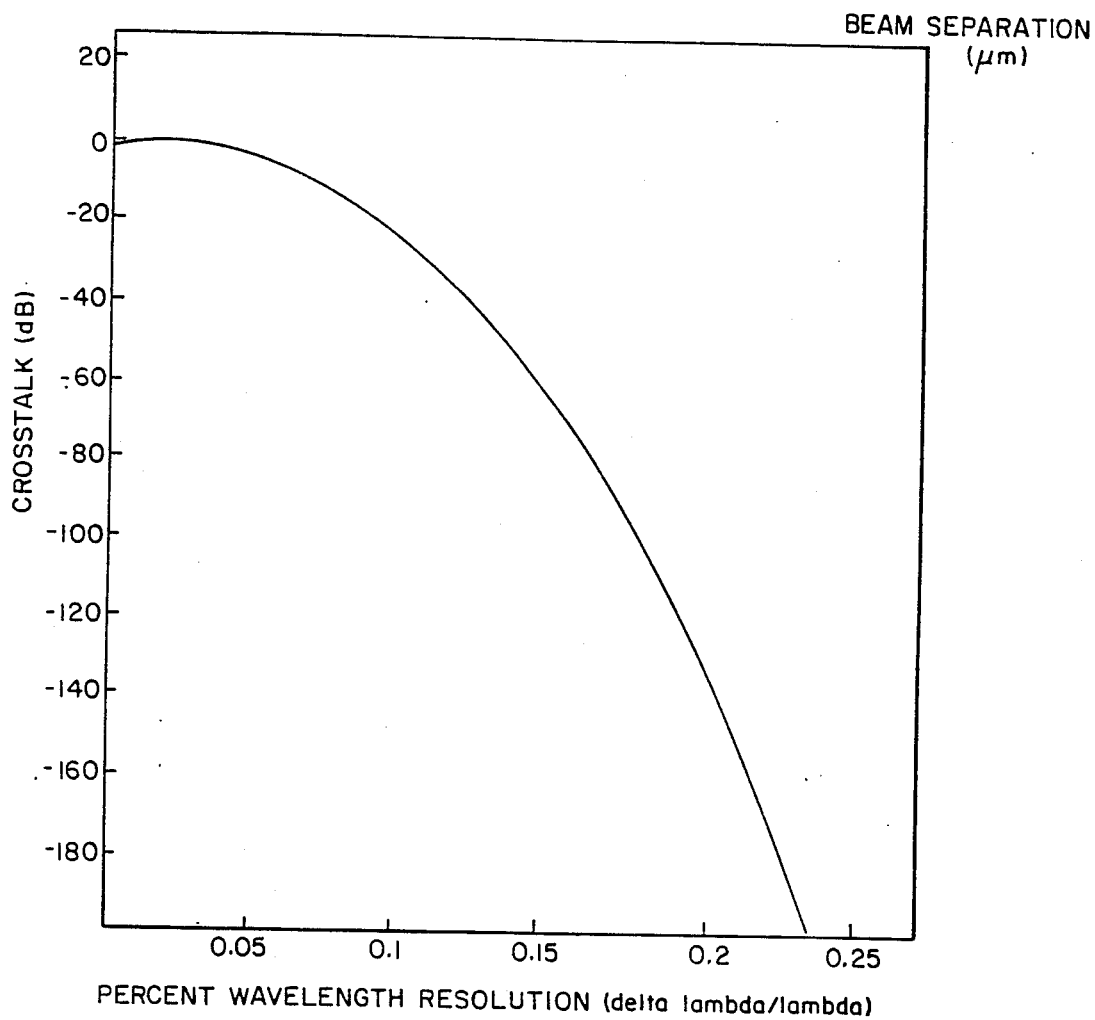
FIG. 9 is a representation of cross-talk or relative power of a beam that falls within the 1/e equi-amplitude curve of the adjacent beam as a function of the wavelength separation between the beams. The computation is specific to the central beams of the grating described in FIG. 7.

The cross-talk between channels for the grating structure produces the beams of FIG. 7 is determined by looking to the relationships expressed in FIG. 9. For the well separated beams at 0.2% wavelength resolution, the theoretical cross-talk is well below −100dB. At even 0.1% resolution which would show the beams as nearly touching the cross-talk is −20dB. The cross-talk represents the fractional power of one beam within the $1/e^2$=power curve or the $1/e$=amplitude curve of the adjacent beam. The presence of an orthogonal polarization component might represent one potential source of cross-talk but through the use of a polarization selective absorber in the waveguide such polarization effects should be mitigated. Cross-talk due to light scattering represents another potential problem of practical importance. The principal source of scattering is likely to occur at the interface between the fiber and the waveguide. Careful preparation of the interface should limit this source of cross-talk particularly in view of the small area of the detectors.

The configuration of the wavelength demultiplexer set forth in FIG. 10 shows a reflection from a reflective surface or polished surface 18 in the substrate such that integrated silicon photodetectors 19 can be fabricated directly in the semiconductor film 13. Silicon photodetectors or any one of a variety of optical energy responsive devices. Their spacing one from another is such as to receive the focussed energy of a discrete wavelength. It is easier to fabricate the photodetectors on film 13 overlying substrate 12 with established integrated circuit fabrication techniques. The embodiment of FIG. 11 has photodetectors 19 in a semiconductor layer 13 on the bottom of substrate 12. The substrate in this embodiment would have to be about twice as thick as the arrangement shown in FIG. 10 since the focal path length is only one-half the other.

Typically a single waveguide and grating 17 on an integrated circuit chip 11 might appear as shown in FIG. 12. A serially arranged set of detectors 19 and their associated pads and electronic circuit components 20 would be included on the same chip and would lend themselves to being fabricated as part of a simultaneous operation. Looking to FIG. 13 the detectors portrayed are known designs with conventional components with eliptical beams 23 focussed on photosensitive areas between electrodes. The array is thusly capable of providing representative signals of several optical mutliplexed wavelengths for further processing on the same chip.

Obviously many modifications and variations of the present invention are possible in the light of the above teachings. It is therefore to be understood that within the scope of the appended claims the invention may be practiced otherwise than as specifically described.

What is claimed is:

1. An apparatus for wavelength demultiplexing single mode optical data transmitted in a plurality of discrete optical wavelengths on an integrated chip substrate comprising:
an optical waveguide disposed on and integrated with the integrated chip substrate for guiding the plurality of optical wavelengths therethrough:
means provided to coextend in the integrated optical waveguide for diffracting the plurality of optical wavelengths therefrom, the diffracting means being configured in a chirped grating to diffract each of the plurality of optical wavelengths into focussed discrete beams at discrete diffraction angles out of the plane of the chirped grating that are different one from the other;
a semiconductor film integrated with and disposed on the integrated chip substrate having its lattice matched to that of the substrate;
a plurality of photodetectors integrated in the semiconductor film on the integrated circuit chip substrate in a juxtaposed relationship each at a location corresponding to where the discrete beams are diffracted and focussed for intercepting the beams and optically detecting the information content thereof to generate representative electrical signs, the seminconductor film and the plurality of photodetectors are located in a substantially coplanar relationship with respect to the optical waveguide and chirped grating; and
means disposed on a parallel side of the substrate spaced from the optical waveguide and the chirped grating for reflecting the diffracted discrete beams onto the photodetectors, the apparatus combining the optical demultiplexing and electronic functions on the integrated chip substrate.

2. An apparatus according to claim 1 in which the optical waveguide and the chirped grating are disposed in the substrate and the semiconductor film is disposed in an overlying relationship on the substrate with the photodetectors disposed therein.

3. An apparatus according to claim 2 further including:
means forming a thermal buffer layer between the semiconductor film and the substrate for isolating the film from optical energy propagating along a surface of the substrate.

4. An apparatus according to claim 2 in which the substrate is sapphire and the semiconductor film is silicon.

5. An apparatus according to claim 2 in which the substrate is sapphire and the semiconductor film is germanium.

6. An apparatus according to claim 2 in which the substrate is sapphire and the semiconductor film is gallium arsenide.

7. An apparatus according to claim 2 in which the substrate is sapphire and the semiconductor film is a quaternary alloy.

8. An apparatus according to claim 2 in which the substrate is $LiNO_3$ and the semiconductor film is silicon.

9. An apparatus according to claim 2 in which the substrate is $LiNO_3$ and the semiconductor film is germanium.

10. An apparatus according to claim 2 in which the substrate is $LiNO_3$ and the semiconductor film is gallium arsenide.

11. An apparatus according to claim 2 in which the substrate is $LiNO_3$ and the semiconductor film is a quaternary alloy.

12. An apparatus according to claim 2 in which the substrate is $LiTaO_3$ and the semiconductor film is silicon.

13. An apparatus according to claim 2 in which the substrate is $LiTaO_3$ and the semiconductor film is germanium.

14. An apparatus according to claim 2 in which the substrate is $LiTaO_3$ and the semiconductor film is gallium arsenide.

15. An apparatus according to claim 2 in which the substrate is $LiTaO_3$ and the semiconductor film is a quarternary alloy.

* * * * *